(12) United States Patent
McTegg

(10) Patent No.: US 12,734,787 B2
(45) Date of Patent: Sep. 15, 2026

(54) PLAYBOARD

(71) Applicant: Maynetic Investments Pty Ltd, Wynnum West (AU)

(72) Inventor: Leigh McTegg, Wynnum West (AU)

( * ) Notice: Subject to any disclaimer, the term of this patent is extended or adjusted under 35 U.S.C. 154(b) by 216 days.

(21) Appl. No.: 18/827,861

(22) Filed: Sep. 9, 2024

(65) Prior Publication Data

US 2025/0083412 A1 Mar. 13, 2025

(30) Foreign Application Priority Data

Sep. 8, 2023 (AU) ................................ 2023902908

(51) Int. Cl.

| | |
|---|---|
| ***B32B 15/085*** | (2006.01) |
| ***B32B 3/08*** | (2006.01) |
| ***B32B 15/18*** | (2006.01) |
| ***B32B 27/08*** | (2006.01) |

(Continued)

(52) U.S. Cl.

CPC .............. *B32B 15/085* (2013.01); *B32B 3/08* (2013.01); *B32B 15/18* (2013.01); *B32B 27/08* (2013.01); *B32B 27/32* (2013.01); *B43L 1/008* (2013.01); *B32B 2255/06* (2013.01);

(Continued)

(58) Field of Classification Search

CPC ..... Y10T 428/12493; Y10T 428/12535; Y10T 428/12549; Y10T 428/12556; Y10T 428/12569; Y10T 428/12771; Y10T 428/12861; Y10T 428/12951; Y10T 428/12958; Y10T 428/12965; Y10T 428/12972; Y10T 428/12979; Y10T 428/3154; Y10T 428/31678; Y10T 428/31681; Y10T 428/31692; Y10S 428/90; B32B 15/00; B32B 15/04; B32B 15/043; B32B 15/08; B32B 15/082;

(Continued)

(56) References Cited

U.S. PATENT DOCUMENTS

| | | | | |
|---|---|---|---|---|
| 10,589,565 B1 * | 3/2020 | Taylor | ...................... | B32B 7/06 |
| 2014/0199678 A1 * | 7/2014 | Tunis | ...................... | F41H 5/08 434/408 |

FOREIGN PATENT DOCUMENTS

| | | | | |
|---|---|---|---|---|
| JP | 3233526 U * | 8/2021 | | |
| KR | 20150000193 U * | 1/2015 | ............. | B32B 33/00 |
| WO | WO-2015151930 A1 * | 10/2015 | ........... | H01F 7/0231 |

OTHER PUBLICATIONS

Machine translation (Espacenet) of JP 3233526 U. Translated Jun. 13, 2026. (Year: 2026).*

(Continued)

*Primary Examiner* — Maria V Ewald
*Assistant Examiner* — Ethan A. Utt
(74) *Attorney, Agent, or Firm* — Pete Adams Law, PLLC

(57) ABSTRACT

A playboard includes a first ferromagnetic metal plate, a first coating on an outer side of the first ferromagnetic metal plate, a first polyolefin film adhered to the inner side of the first ferromagnetic metal plate, a layer of low density polyethylene on the first polyolefin film adhered to the inner side of the first ferromagnetic metal plate, a second polyolefin film adhered to the layer of low density polyethylene on the first polyolefin film adhered to the inner side of the first ferromagnetic metal plate. The playboard preferably has a mounting means to secure the playboard to a wall. For example, the mounting means may be double sided tape and/or a hook and loop fastener.

9 Claims, 2 Drawing Sheets

(51) Int. Cl.
*B32B 27/32* (2006.01)
*B43L 1/00* (2006.01)

(52) U.S. Cl.
CPC ..... *B32B 2255/26* (2013.01); *B32B 2307/208* (2013.01); *B32B 2307/4023* (2013.01)

(58) Field of Classification Search
CPC ... B32B 15/085; B32B 15/18; B32B 2307/20; B32B 2307/208
USPC ....... 428/615, 621, 622, 623, 624, 626, 655, 428/668, 681, 682, 683, 684, 685, 421, 428/457, 458, 461, 900
See application file for complete search history.

(56) References Cited

OTHER PUBLICATIONS

Machine translation (Espacenet) of KR 2015-0000193 U. Translated Jun. 13, 2026. (Year: 2026).*
Machine translation (Espacenet) of WO 2015/151930 A1. Translated Jun. 13, 2026. (Year: 2026).*

* cited by examiner

PLAYBOARD

BACKGROUND OF THE INVENTION

1. Field of the Invention

The present invention relates to the children's educational toy industry and, more particularly to a vertical playboard for children.

2. Description of Related Art

Children have a natural inclination to write on walls. Children enjoy engaging with vertical surfaces for play, learning, and development. Using vertical surfaces for activities like drawing and painting strengthens fine motor skills, including hand and finger coordination. Engaging with vertical surfaces promotes the development of shoulder stability and core strength, which are essential for overall coordination and control. Working on vertical surfaces enhances hand-eye coordination as children guide their hand movements to follow lines or shapes. Activities on vertical surfaces, such as drawing or writing with both hands, promote bilateral coordination, facilitating tasks like buttoning shirts or tying shoelaces. Vertical play supports the development of self-regulation skills as children engage in focused activities on vertical surfaces, fostering concentration and emotional regulation. Vertical play engages postural muscles, improving postural control and core stability, which are crucial for maintaining a stable sitting or standing posture. By engaging with activities such as drawing, writing, and interactive games on vertical surfaces, children can enhance their fine motor skills and coordination. Engaging with vertical surfaces enhances visual tracking skills and the integration of visual information with motor actions, supporting activities like reading and writing. Engaging with vertical surfaces helps develop attention span and concentration, as children concentrate on following lines or completing tasks.

Large whiteboards are currently available. However, they are not aesthetically pleasing for parents to put in the walls of their households. Large whiteboards tend to be on trolleys for use in office environments, or large and bulky, so that they are not easily mounted on walls. Parents could have an aversion to mounting large whiteboards permanently on their household walls because of the potential damage it causes to the wall. Prospective purchasers of homes may not like a whiteboard permanently affixed on the wall of a room, which may not be for an office or for children. A lot of people who rent accommodation would not be allowed to mount a whiteboard on a wall because of potential damage to the wall.

Small whiteboards are currently available. However, they are inherently designed for horizontal use, such as on the lap or on a desk. They require screws to be permanently affixed in a wall on which they are mounted. The screw mount makes the whiteboard protrude from the wall. The thickness of a traditional whiteboard also makes it protrude from the wall. The frame of a traditional whiteboard could be inadvertently knock by a child, which could scratch the wall. If the whiteboard falls from the wall, it could injure the child.

The object of the present invention is to provide a playboard for children which is light, has a low profile, can be vertically mounted to a wall without damaging it, and which has a seamless aesthetic appeal for parents.

SUMMARY OF THE INVENTION

According to the present invention there is provided a playboard comprising:

(a) a first ferromagnetic metal plate;
(b) a first coating on an outer side of the first ferromagnetic metal plate;
(c) a first polyolefin film adhered to the inner side of the first ferromagnetic metal plate;
(d) a layer of low density polyethylene adhered to the first polyolefin film adhered to the inner side of the first ferromagnetic metal plate;
(e) a second polyolefin film adhered to the layer of low density polyethylene on the first polyolefin film adhered to the inner side of the first ferromagnetic metal plate;
(f) a second ferromagnetic metal plate attached to the second polyolefin film adhered to the layer of low density polyethylene on the first polyolefin film adhered to the inner side of the first ferromagnetic metal plate; and
(g) a second coating on the outer side of the second ferromagnetic metal plate attached to the second polyolefin film adhered to the layer of low density polyethylene on the first polyolefin film adhered to the inner side of the first ferromagnetic metal plate.

Preferably, the ferromagnetic metal is ferromagnetic metal.

The coatings could be a dry powder coat, a wet paint coat, a porcelain coat, or a ceramic coat for example. The coatings provide a stain resistant surface which can be written on and then the writing can be easily erased. The coatings may have a pigmented colour.

One example of a coating could be fluorine carbon coating which is a solvent-based, polyvinylidene fluoride. The weight percentage of the coating could be, for example, fluorine carbon resin in the ratio of 20% to 30%, acrylic resin in the ratio of 7% to 10%, pigments in the ratio of 0% to 40% and an aromatic solvent in the ratio of 30% to 50%.

Another example of a coating could be a dry powder coat, comprising Barium Sulphate OSHA PEL in the ratio of 3% by weight (e.g., Chemical Abstract Service number 7727-43-7), Triglycidyl Isocyanurate in the ratio of equal to or less than 5% (e.g., CAS number 2451-62-9), Talc in the ratio of equal to or less than 3% (e.g., CAS number 14807-96-6) and Titanium Dioxide OSHA PEL in the ratio of 30% (e.g., CAS number 13463-67-7).

The coatings should not contain any halogens or heavy metals such as selenium, antimony, arsenic, cadmium, lead and mercury (as these chemicals can be harmful to people and particularly children).

The adhesive may be a water-based spray glue, such as an adhesive containing a water-based neoprene latex (e.g., CAS number 9010-98-4), a water-based resin (e.g., CAS number 9003-74-1) and deionized water (e.g., CAS number 7732-18-5). The adhesive could also be a hot melt polyamide adhesive.

The playboard preferably has a mounting means to secure the playboard to a wall. For example, the mounting means may be double sided tape and/or a hook and loop fastener.

In preferred forms of the invention, the playboard has a border made of silicone affixed around its edge. The border conceals sharp edges of the playboard. The border is preferably food grade extruded silicone channel.

Any of the features described herein can be combined in any combination with any one or more of the other features described herein within the scope of the invention.

BRIEF DESCRIPTION OF THE DRAWINGS

Embodiments of the invention will be described with reference to the following drawings, in which.

DETAILED DESCRIPTION OF THE INVENTION

Figure 1:
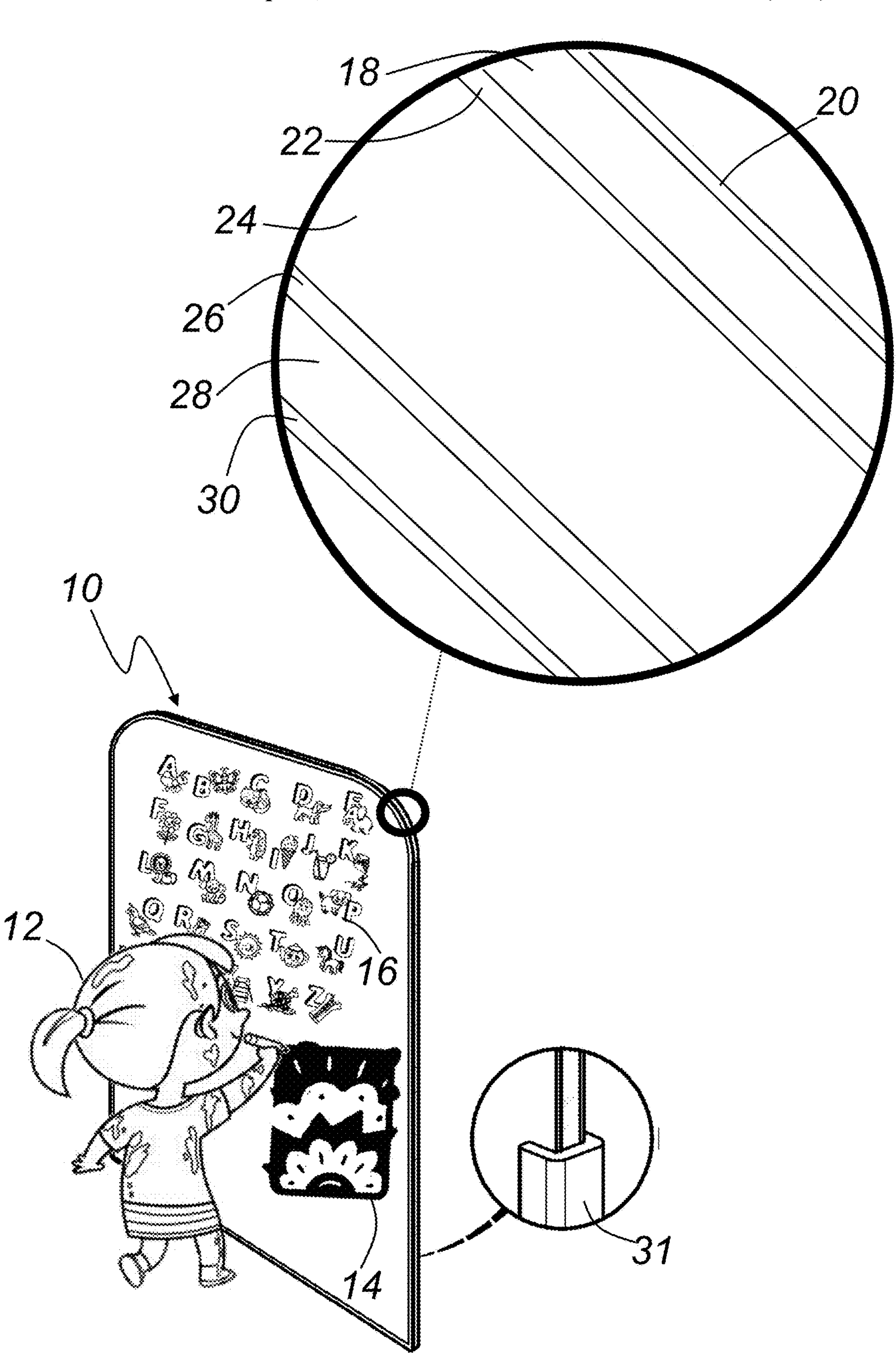
FIG. 1 is representation of a front view of a playboard and its constituent parts according to an embodiment of the present invention.

FIG. 1 shows a playboard 10 being used by a child 12 to make a drawing 14. The playboard 10 is magnetically receptive so it has magnet letters 16 on it for the child 12 to play with.

The playboard 10 has a first ferromagnetic metal plate 18 (preferably made of steel), which has a first coating 20 on an outer side of the first ferromagnetic metal plate 18.

A first polyolefin film 22 is adhered to the inner side of the first ferromagnetic metal plate 18. A layer of low-density polyethylene 24 is adhered to the first polyolefin film 22 which is adhered to the inner side of the first ferromagnetic metal plate 18.

A second polyolefin film 26 is adhered to the layer of low-density polyethylene 24 on the first polyolefin film 22 adhered to the inner side of the first ferromagnetic metal plate 18.

A second ferromagnetic metal plate 28 is attached to the second polyolefin film 26 adhered to the layer of low-density polyethylene 24 on the first polyolefin film 22 adhered to the inner side of the first ferromagnetic metal plate 18.

The second ferromagnetic metal plate 28 makes the whiteboard 10 double sided. This has the advantage that one side of the whiteboard 10 can be one colour and the other side of the whiteboard 10 can be another colour.

A second coating 30 on the outer side of the second ferromagnetic metal plate 28 is attached to the second polyolefin film 26 adhered to the layer of low density polyethylene 24 on the first polyolefin film 22 adhered to the inner side of the first ferromagnetic metal plate 18.

The second coating 30 enables any drawings to be wiped off the playboard 10. The playboard 10 can be reversed so that the first coating 20 is presented to the child 12. The first coating 20 also enables any drawings to be wiped off the playboard 10.

The ferromagnetic metal plates 18 and 28 enable the playboard 10 to be magnetically receptive.

The first coating 20 and/or the second powder 30 coat may have a pigmented colour for aesthetic appeal. For example, the first coating 20 on the back of the playboard 10 may be pastel blue and the second coating 30 on the front of the playboard 10 may be pastel pink. Thereby, the playboard 10 can be reversed and changed for the sake novelty. This aspect of the invention also increases the overall longevity of the writing surfaces on the product. This confers a substantial advantage of the invention over the prior art.

In preferred forms of the invention, the playboard 10 has a border 31 around its outside edges. The border 31 is made of food grade silicone. The border 31 protects the layers of the playboard 10. The border 31 covers the sharp edges of the playboard 10. The border 31 also minimises any potential damage that the playboard 10 could do to walls when it is installed by the user. The border 31 maintains the weatherproof element for permanent placement outdoors.

Figure 2:
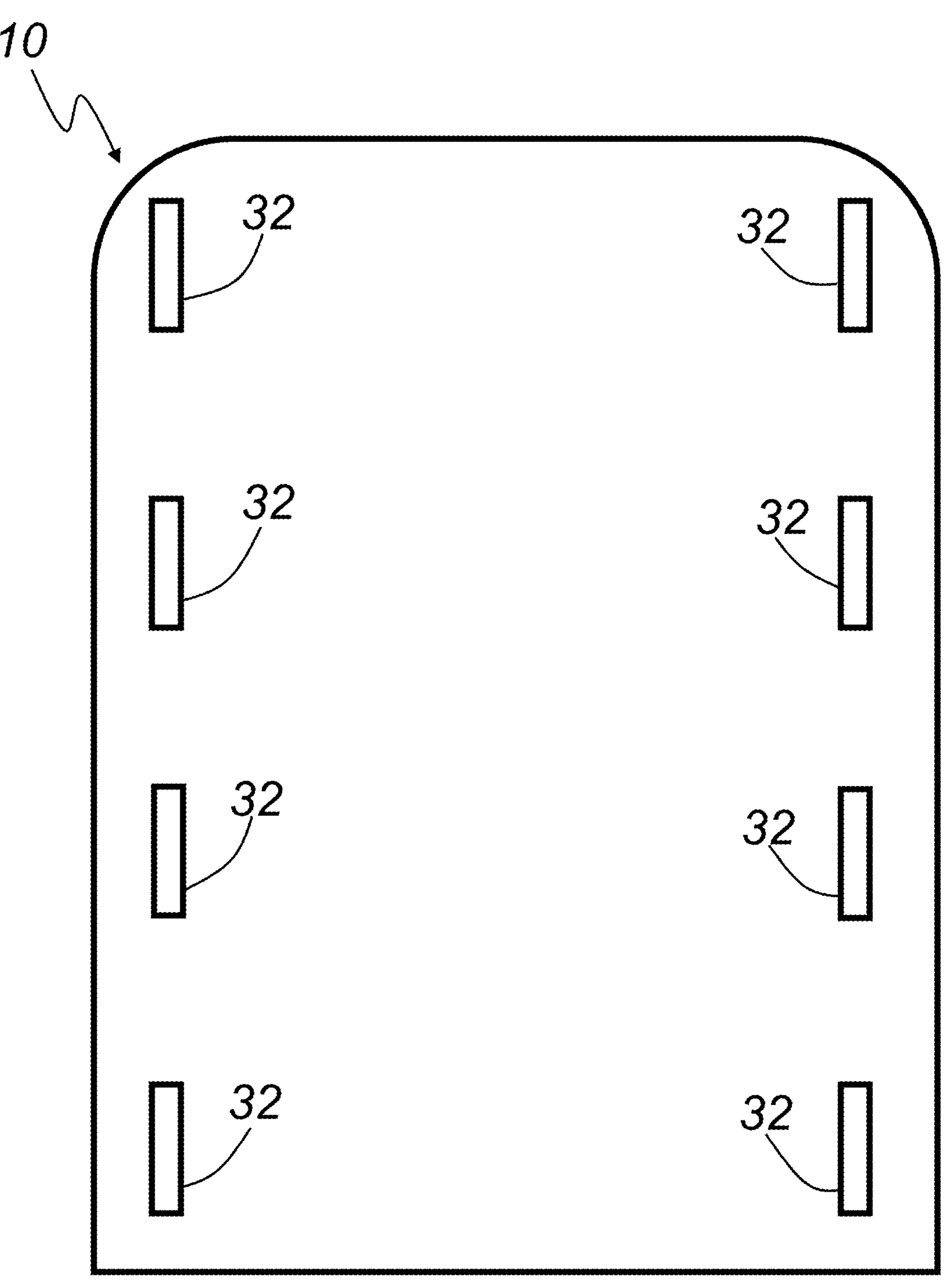
FIG. 2 is a representation of a rear view of the playboard of FIG. 1.

The playboard 10 preferably has mounting means, such as double-sided tape and/or a hook and loop fasteners 32 as shown in FIG. 2. These forms of mounting means are detachable and will not damage either the mounting wall or the playboard 10.

The playboard 10 thereby fulfils the objects of the invention. It is light with a low profile that can be vertically mounted to a wall without damaging it and it has a seamless aesthetic appeal for parents.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A playboard comprising:

(a) a first ferromagnetic metal plate;

(b) a first coating on an outer side of the first ferromagnetic metal plate;

(c) a first polyolefin film adhered to an inner side of the first ferromagnetic metal plate;

(d) a layer of low density polyethylene adhered to the first polyolefin film adhered to the inner side of the first ferromagnetic metal plate;

(e) a second polyolefin film adhered to the layer of low density polyethylene on the first polyolefin film adhered to the inner side of the first ferromagnetic metal plate;

(f) a second ferromagnetic metal plate attached to the second polyolefin film adhered to the layer of low density polyethylene on the first polyolefin film adhered to the inner side of the first ferromagnetic metal plate; and (g) a second coating on an outer side of the second ferromagnetic metal plate attached to the second polyolefin film adhered to the layer of low density polyethylene on the first polyolefin film adhered to the inner side of the first ferromagnetic metal plate.

2. The playboard of claim 1, wherein the first coating is a solvent-based, polyvinylidene fluoride.

3. The playboard of claim 1, wherein the second coating is a solvent-based, polyvinylidene fluoride.

4. The playboard of claim 1, wherein the first coating has a pigmented colour.

5. The playboard of claim 1, wherein the second coating has a pigmented colour.

6. The playboard of claim 1, wherein the playboard includes a mounting means to attach the playboard to a wall.

7. The playboard of claim 6, wherein the mounting means is double sided tape.

8. The playboard of claim 6, wherein the mounting means is a hook and loop fastener.

9. The playboard of claim 1, wherein the playboard has a border made of silicone affixed to the playboard.

* * * * *